United States Patent [19]

Barr

[11] Patent Number: 4,946,491
[45] Date of Patent: Aug. 7, 1990

[54] METHOD AND APPARATUS FOR GLASS TEMPERING

[75] Inventor: Jonathan Barr, Leigh Sinton, England

[73] Assignee: Glasstech, Inc., Perrysburg, Ohio

[21] Appl. No.: 274,459

[22] Filed: Nov. 21, 1988

[51] Int. Cl.$^5$ ............................................. C03B 27/04
[52] U.S. Cl. ........................................ 65/114; 65/115; 65/161; 65/163; 65/348
[58] Field of Search ................. 65/104, 114, 115, 348, 65/349, 161, 163

[56] References Cited

U.S. PATENT DOCUMENTS

| | | | |
|---|---|---|---|
| 1,960,222 | 5/1934 | Long | 65/114 |
| 3,994,711 | 11/1976 | McMaster | 65/163 |
| 4,178,414 | 12/1979 | Greenhalgh | 65/114 |
| 4,182,619 | 1/1980 | Greenhalgh | 65/114 |

*Primary Examiner*—Joye L. Woodard
*Attorney, Agent, or Firm*—Brooks & Kushman

[57] ABSTRACT

An improved glass tempering apparatus and method is disclosed. A glass sheet is quenched by heating the glass sheet and horizontally transferring the sheet on a roller conveyor into a quenching station having an upper and lower array of nozzles for directing coolant on opposite sides of the glass. A first array of points on the glass sheet are cooled, then the glass is horizontally jogged within the quenching station and a second array of points are cooled. Preferably, the jog distance is selected so that the first and second array of points are uniformly spaced relative to one another. An alternative embodiment of the invention cools a first array of points, horizontally jogs the glass within the quenching station and recools the same array of points with each point being cooled by a different nozzle pair so that the cooled points are uniformly sized and clearly defined with minimum irregularities resulting from roller shrouding and nozzle-to-nozzle variability.

13 Claims, 3 Drawing Sheets

METHOD AND APPARATUS FOR GLASS TEMPERING

TECHNICAL FIELD

This invention relates to an improved glass sheet quenching apparatus and method when the glass is supported on a horizontal roller or conveyor and quenched between an upper and lower array of nozzles.

BACKGROUND

Glass sheets are quenched to provide tempering or heat strengthening resulting from internal stress resulting from a temperature gradient within the glass during the cooling. Quenching increases a mechanical strength in the glass and hence provides an increased resistance to breakage as apparent to annealed glass which has a minimal internal stress. In tempering, quenching gas or other coolant is impinged upon opposite surfaces of the glass sheet to provide rapid cooling so that the final cooled glass sheet has compressive forces at its surface and tensile forces at its center making it stronger and more resistant to breakage. Tempered glass also has a characteristic of breaking into relatively small pieces as compared to the sharp shards which result when annealed glass is broken.

With heat strengthening, quenching gas is also impinged on opposite surfaces of the glass sheet but at a much lower rate and resulting in less compressive forces than tempered glass. Both tempering and heat strengthening, can be performed on flat or curved glass sheets conventionally used for architectural purposes or for vehicle windows.

From a safety standpoint, it is important that when tempered or heat strengthened window glass breaks no large, sharp splines form which could seriously harm a person. Various motor vehicle regulating authorities specify the maximum spline length resulting when a passenger vehicle window fractures. Small spline sizes are relatively easy to achieve with a thick window glass but when thickness is approached five millimeters or less, spline length begins to increase to the unacceptable range 20–30 millimeters depending upon the particular standard. In addition to regulating the maximum shard size, the minimum particle size is also regulated. While large splines pose a danger of laceration, small particles pose a potential danger of ingestion. The requirements of various regulatory agencies is described in U.S. Pat. No. 4,128,690, 4,178,414 and 4,182,619 which are incorporated herein by reference.

In order to achieve a uniform particle size upon glass breakage without having small ingestable particles or large sharp splines glass, quenching devices have been developed which utilize arrays of nozzles which cool a series of points across the glass surface. The resulting non-uniform stress distribution across a glass surface helps to prevent the formation of long splines.

Glass sheet quenching devices conventionally include apposed blastheads oriented on opposite sides of the glass sheet to be quenched. Each blasthead is provided with a plenum housing which is supplied with a pressurized quenching gas and has a plurality of nozzles for directing discrete jets of coolant against the glass surface. A similar blasthead structure specifically designed to quench glass while horizontally supported on a roller conveyor is shown in U.S. Pat. No. 4,515,622 which is incorporated by reference herein.

When quenching glass sheets, it is important to maintain uniform cooling gas flow and pressure so as to prevent any significant variation in pressure over the surface of the glass sheet being quenched or a variation from sheet to sheet. One of the factors having to cause cooling variation from nozzle to nozzle is the influence of the rollers upon which the glass rests. The presence of the rollers tend to hinder the flow of gas to points cooled adjacent thereto. Points cooled while located adjacent a roller tend to be non-symmetrical. Blasthead nozzles are designed in such a manner so that roll shrouding affects are minimized, however, there remains significant room for further improvement.

DISCLOSURE OF INVENTION

An object of the present invention is to provide an improved apparatus and method for quenching glass sheets which break into small particles without forming long splines or fine granules. In carrying out this object, the improved quench apparatus and method is carried so as to enable relatively thin sheets of glass to be tempered.

Another object of the present invention is to quench a glass sheet using an array of nozzles to cool a series of uniform points spaced across the glass surface with minimal irregularities resulting from roller shrouding and nozzle-to-nozzle variability.

The improved method of quenching a glass sheet according to the invention begins with the heating of the glass sheet to the desired quenching temperature. The glass sheet is then horizontally transferred on a roller conveyor into a quenching station having an upper and lower array of nozzles which direct coolant upon opposite sides of the glass sheet. A gas which acts as a coolant is supplied to the upper and lower nozzle array and is then directed upon a glass sheet to cool a first array of points. After cooling the first array of points, the glass is horizontally jogged within the quench station a specified distance and a second array of points are cooled. Preferably, the glass is jogged a distance sufficient to cause the first and second array of points to be uniformly spaced across the surface of the glass sheet.

The apparatus for quenching the glass sheet is made up of a horizontal roller conveyor for horizontally transferring the glass sheet, an upper and lower array of nozzles for cooling an array of points on the glass sheet, a conveyor drive and a source of coolant gas. A control mechanism is further provided for regulating the movement of the conveyor drive mechanism and the flow of coolant from the upper and lower nozzle arrays. A control mechanism causes the heated glass sheet to enter the apparatus and stop where the upper and lower nozzle arrays cool a first set of points, and to jog the glass sheet to a second position where the nozzles cool a second array of points. The first and second points are preferably spaced equidistant from one another so that the first and second array of points uniformly cover the entire surface of the glass sheet.

In an alternative embodiment of the invention, a somewhat similar apparatus and method is employed. However, after the first array of points is cooled, the glass is horizontally jogged a specified distance so that the same array of points can be recooled with each point being cooled by a different nozzle pair thereby minimizing the irregularities resulting from nozzle-to-nozzle variability and roller shrouding. The glass sheet formed in accordance with this method is likewise novel. The glass sheet has an array of points uniformly spaced across its surface having relatively high temper. These points are much more uniformly sized and clearly defined with minimal irregularities compared to glass sheets of the prior art.

The objects, features and advantages of the present invention are readily apparent from the following detailed description of the best modes for carrying out the invention when taken in connection with the accompanying drawings.

DESCRIPTION OF THE PREFERRED EMBODIMENT AND BEST MODEs FOR CARRYING OUT THE INVENTION

Figure 1:
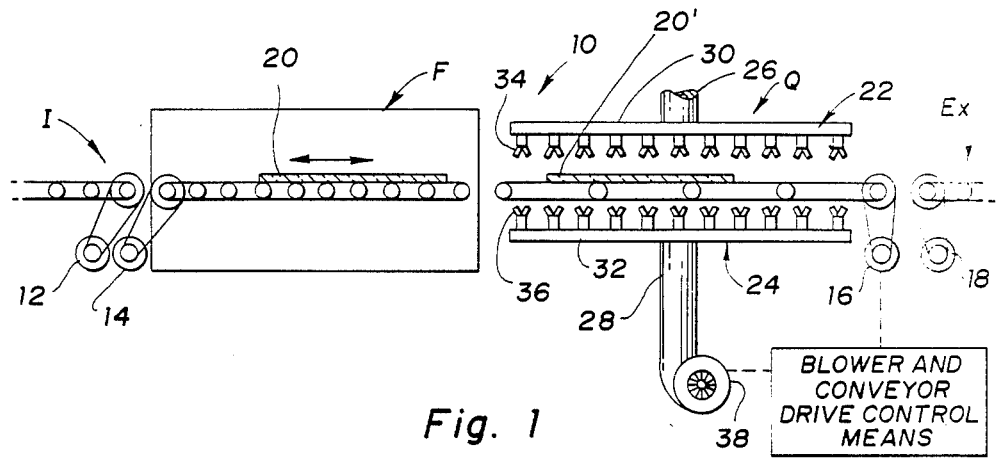
FIG. 1 is a schematic side elevation view of a glass tempering system including a quenching apparatus constructed in accordance with the present invention.

Referring to FIG. 1 of the drawings, a horizontal glass tempering system 10 is schematically shown including an inlet conveyor I, a furnace F, a quench Q, and an exit conveyor EX, each having its own horizontal roller conveyor drive 12, 14, 16 and 18 respectively. Flat glass sheets are horizontally transferred through the quench system in an intermittent manner. A glass sheet is placed on the horizontal inlet conveyor I and is transferred into furnace F where it is heated to the quenching temperature. Preferably, the furnace is of the type disclosed in U.S. Pat. Nos. 3,934,970, 3,947,242 or 3,994,711. While the glass is in the furnace and is being heated, the glass should be maintained in a moving state to prevent the glass from sagging between adjacent rolls. Glass can continually advance in a forward direction as would be the case in a large high production furnace or alternatively, moved back and forth in an oscillating manner as described in U.S. Pat. No. 3,994,711. Once the glass has reached the quenching temperature, approximately 630° C., the glass is quickly horizontally transferred from the furnace into quench Q. Quench Q is made up of an upper and lower blasthead 22 and 24, each having a coolant inlet 26 and 28, a plenum 30 and 32 and an array of nozzles 34 and 36. The nozzles in the upper and lower array are generally aligned in pairs for directing the streams of cooling gas upon glass sheet 20'. Cooling gas is provided to the gas inlets on a periodic oasis by blower 38 or the like. Control means, as schematically shown in FIG. 1, is provided for cooperating with the drive means 16 and the blower 38, to control the position of the glass sheet within the quench unit and the periodic cooling of the glass sheet.

After the glass sheet 20' reaches a first position within the quench unit, a first array of points on the glass sheet are cooled by the upper and lower blastheads. After the first array of points is cooled but before the glass sheet has cooled below the temperature range, the glass is horizontally jogged and the second array of points are cooled. The glass is then transferred to the conveyor. The various steps of the method of operation of the apparatus as set forth in FIG. 2 in block diagrams.

Figure 3:
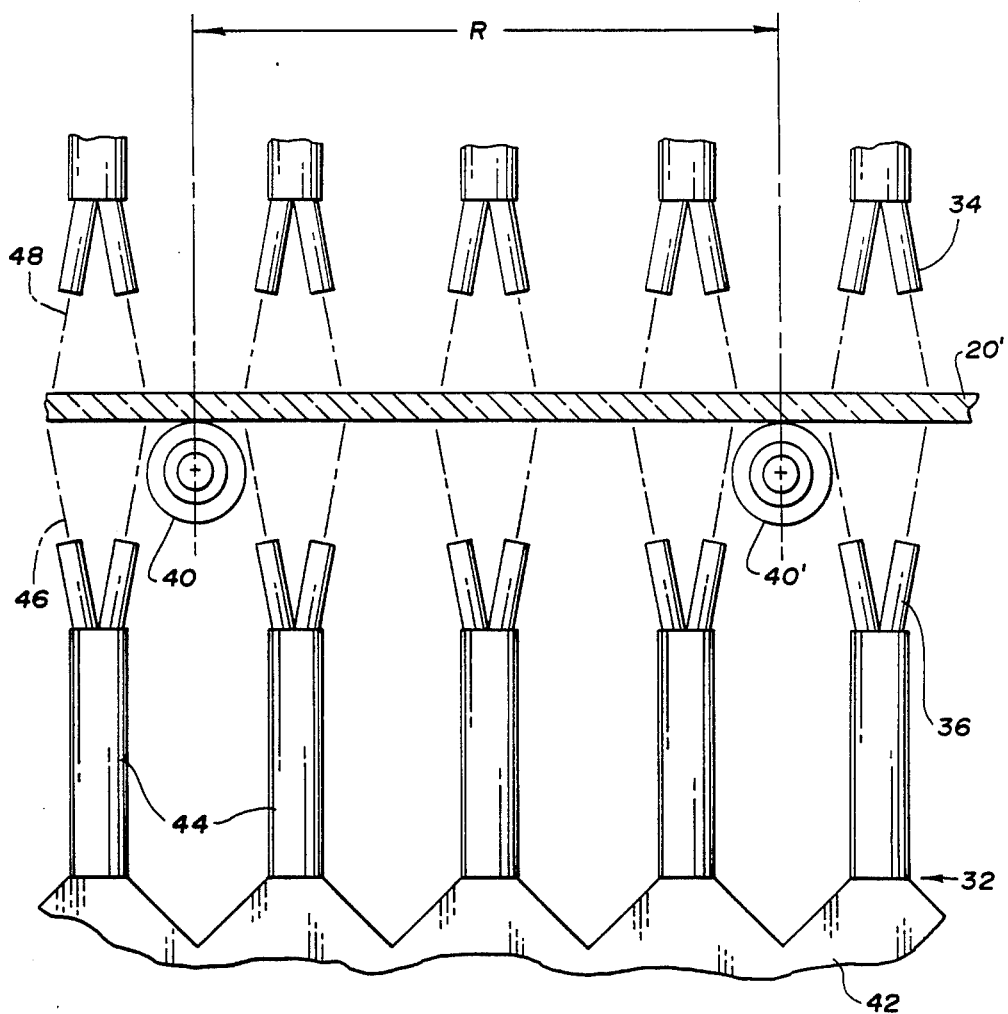
FIG. 3 is an enlarged side elevational view of the quenching apparatus showing the orientation of the upper and lower nozzles to the glass and support rollers.

FIG. 3 is an enlarged side view showing the position of the upper and lower nozzle array 34 and 36 relative to the glass sheet 20'. The glass sheet 20' is horizontally supported on rollers 40 and 40' which are spaced apart longitudinally a distance R as shown. The upper and lower blastheads which are used to cool an array of points on the glass sheet must be designed so that there is ample space for the flow of spent or exhaust quench gas. The blastheads generally include a plenum into which the pressurized quenching gas is introduced and a plurality of nozzles which direct the coolant upon the glass sheet in the desired spot pattern. As shown in FIG. 3, lower plenum 42 is provided with a main plenum housing 42 in which pressurized quench gas is introduced in a plurality of elongated transverse plenum 44 which extend generally perpendicular to the longitudinal axis of the quench system. Each of the transverse plenum have a plurality of nozzles evenly spaced along the transverse plenum length.

In the preferred embodiment shown, alternative nozzles are inclined in opposite directions relative to the vertical centerline of the transverse plenum so that a single transverse plenum may form two columns of cooled points on the glass sheet. The region generally bounded between adjacent transverse plenum provides sufficient space for the spent cooling gas to transversely flow out of the blasthead. The lower nozzle array provides upwardly directed angular gas jets 46 and the upper nozzle array provides downwardly directed angular gas jets 48 which generally meet one another to form a spot on the glass sheet 20'. The upwardly directing gas jets 46 are oriented to avoid impinging upon the rollers 40 and 40'. However, since the rollers will shroud the flow of the cooling gas after it impinges upon the glass, the points cooled which are adjacent a roller will tend to be irregular in shape and not as clearly defined as spots which are cooled when not directly adjacent a roller.

Figure 4:
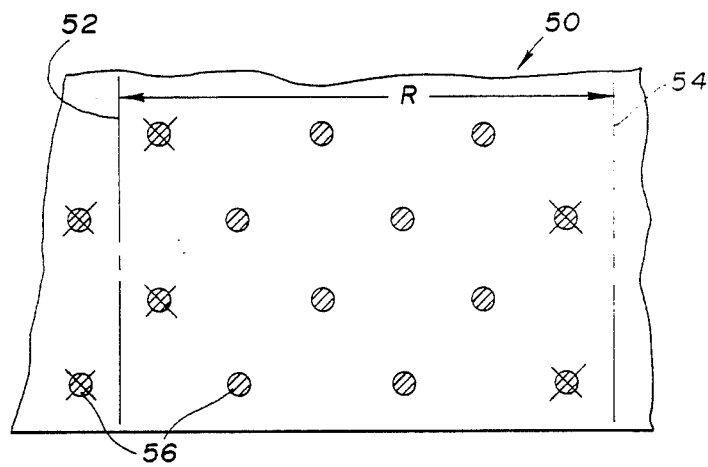
FIG. 4 is a plan view of a portion of the glass sheet with the first array of points and roller locations indicated thereon.

FIG. 4 depicts a segment of glass sheet 50 in plan view with rollers center lines 52 and 54 shown separated by roller spacing R. The shaded circles 56 represent the first array of points cooled by the upper and lower blastheads. The first points are oriented in rows and columns, the rows being parallel to the longitudinal axis of the apparatus and the columns being parallel to the roller axes. The spacing between adjacent points and a row is substantially equal to the spacing between adjacent points and a given column which is approximately twice the distance between adjacent rows or adjacent columns resulting in a matrix having a 50% spot density.

Figure 5:
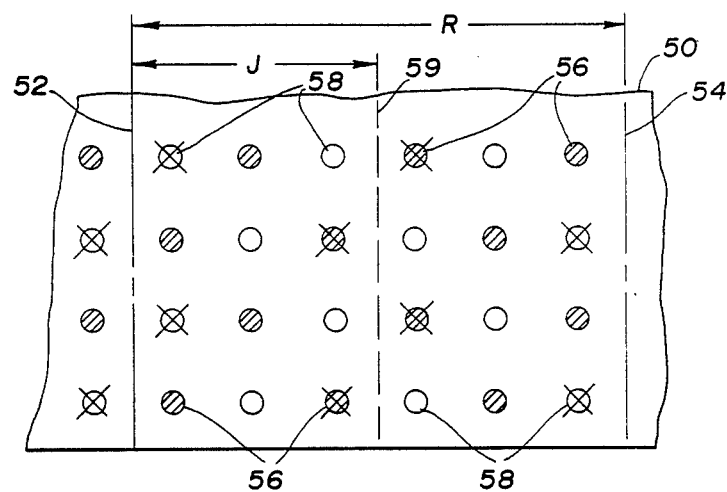
FIG. 5 is a plan view of a portion of the glass sheet with both the first and second array of points depicted thereon.

The first points oriented adjacent a roller during the cooling of the first cooling step are marked with an X through the point. After the first array of points are cooled sufficiently, the glass is horizontally jogged a distance J, shown in FIG. 5, and a second array of points 58 are cooled. The jog distance J is preferably equal to an odd increment of column spacing which is closest to the midway point between adjacent rollers. An odd increment of column spacing refers to 1, 3, 5 etc. column widths. Distance J, shown in FIG. 5, is equal to 3 column widths thereby causing the second array of points 58 represented by the unshaded circles to be alternatively spaced in the rows and columns with the points in the first array 56. The resulting matrix of first and second points has a 100% spot density, i.e. all of the locations in the matrix defined by the rows and columns are filled with a cooled point. The points in the second array oriented adjacent the roller during cooling are similarly marked with an X.

In the preferred embodiment, the apparatus shown in FIG. 3 there is three transverse plenums 44 and six columns of nozzles inbetween adjacent rollers. The glass sheet shown in FIG. 4 has six columns of points formed on a glass sheet with distance R, corresponding to the nozzles in the upper and lower blastheads. In order to maintain a uniform spot pattern, it is important that the jog distance be controlled relatively closely. The quench unit roller conveyor drive 16 is therefore provided with an encoder or other conventional position sensing means to adequately control the jog distance so that the first and second array of points has their columns substantially aligned as shown in FIG. 5. The first points 56 which were originally shrouded and marked with an X are shown adjacent a broken 59 line representing the position of roller axis 52 at the time the first array of points were cooled. By jogging the glass a distance equal to three column widths, the points which were shrouded when cooled are more uniformly spaced across the glass sheets than if the glass was only jogged one column width. Preferably the glass is jogged a distance which is an odd increment of column width which most closely approximates ½ of the distance between adjacent rollers. Preventing the shrouded points from being grouped together, the chances of obtaining long splines when the glass is broken is minimized.

Figure 6:
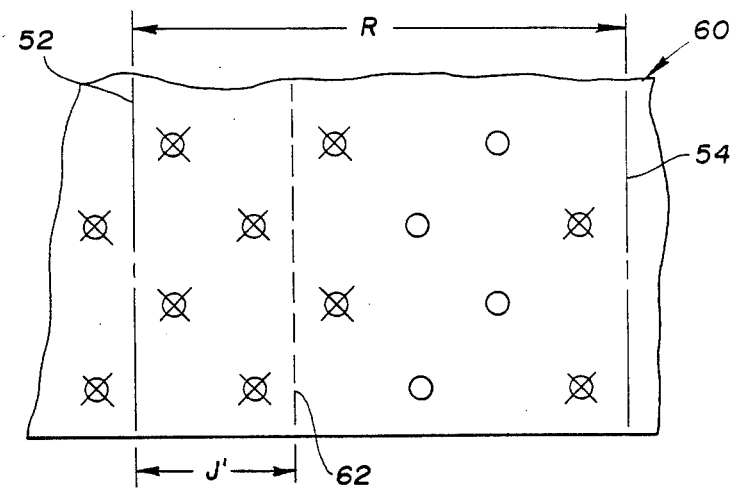
FIG. 6 is a plan view of a portion of the glass sheet having the array of cooled points, roller spacing and jog distance indicated thereon where the glass is quenched using an alternative embodiment of the method and apparatus.

An alternative embodiment of the method can be employed to quench a sheet of glass 60 as shown in FIG. 6. A first array of points is originally quenched in a similar manner as described with reference to FIG. 4. The glass is then jogged a distance J' which is equal to an even increment of column spacing which is closest to a midway point, or ½ of the distance between adjacent rollers. The glass sheet 60 shown in FIG. 6 only has a 50% density since all of the points of the first array are merely recooled by different nozzle pairs after the glass is jogged. Preferably, no point will be adjacent a roller during both the first and second cooling steps thereby minimizing the adverse affects of roller shrouding. Broken line 62 represents the roller placement during the first cooling step. Center lines 52 and 54 represent the roller spacing during the second cooling step. The points marked with an X have been cooled adjacent a roller during one of the cooling steps. Likewise, the adverse affects of nozzle-to-nozzle variability are minimized since each point is cooled by two different nozzle pairs. If, for example, a nozzle in the blasthead were to be damaged or obstructed, a large totally untempered glass segment would not be formed since the glass would be at least partially quenched by different nozzle pairs during the second quenching step.

Figure 2:
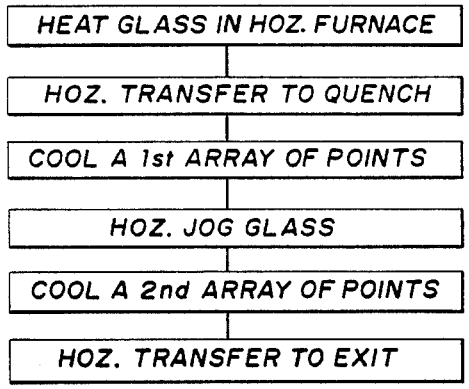
FIG. 2 is flow chart depicting the method quenching steps.

The alternative method operation is basically the same as the first method as shown in FIG. 2. The horizontal jog step, however, jogs the glass an even increment of column spacing and a second cooling step recools the original array of points using different nozzle pairs. The apparatus for tempering glass utilizing the alternative method embodiment is quite similar to that described with reference to the first method. The only significant difference in the apparatus would be that the quench conveyor drive would be adjusted to jog the glass in even increment column spacing as opposed to an odd increment of column spacing so that the points are recooled as opposed to forming a second array of points.

The glass sheet formed in accordance with the first and second methods exhibit novel characteristics not previously obtainable. With reference to glass sheets formed in accordance with the first method, a 100% spot density matrix can be achieved where no two adjacent points in any given row or column are both cooled while adjacent a roller. The resulting glass sheet has a more uniform tempered pattern and is less likely to form long splines when fractured.

Glass sheets manufactured in accordance with the alternative method likewise exhibits novel characteristics not previously achieved. Glass sheet 60 has each spot cooled by at least two different nozzles pairs resulting in a greatly improved point-to-point temper consistency since the effects of nozzle variability and roller shrouding are minimized.

While the best modes for carrying out the invention have been described in detail, those familiar with the art to which the invention relates will recognize various alternative designs and embodiments for practicing the invention as defined by the following claims.

What is claimed is:

1. A method of quenching a glass sheet comprising the following steps:
   heating the glass sheet;
   transferring the heated glass sheet on a horizontal roller conveyor to a first position in a quenching station having an upper and lower array of nozzles for directing coolant upon opposite sides of the glass sheet and cooling a first array of points on the glass sheet while in the first position; and
   horizontally jogging the glass sheet on the conveyor within the quenching station a selected distance to a second position so that a series of points nearest a roller of the conveyor during the step of cooling the first array are no longer adjacent a roller of the conveyor and cooling a second array of points on the glass sheet while in the second position.

2. The method of claim 1, wherein the jogging step moves the glass sheet a distance selected to cause the first array of points to be uniformly spaced relative to the second array of points.

3. The method of claim 1, wherein each of the points forming the first and second array are cooled by corresponding upper and lower nozzles simultaneously directing coolant upon opposite sides of the glass sheet.

4. The method of claim 1, wherein the step of jogging the glass sheet further comprises moving the glass sheet a distance which is an odd increment of column width which most closely approximates ½ of the distance between adjacent rollers.

5. A method of quenching a glass sheet comprising the following steps:
   heating a glass sheet;
   transferring the heated glass sheet on a horizontal roller conveyor along a substantially horizontal axis to a first position in a quenching station having an upper and lower array of nozzles aligned in pairs for directing coolant upon the glass sheet surfaces and cooling a first array of points on the glass sheet while in the first position; and horizontally jogging the glass sheet on the conveyor within the quenching station a distance to a second position sufficient to realign the first array of points with the upper and lower array of nozzles with no point adjacent a roller of the conveyor during the step of cooling the first array remaining adjacent a roller of the conveyor and re-cooling the first array of points with each individual point of said points being re-cooled by a different nozzle pair while in the second position.

6. The method of claim 5, wherein the step of jogging the glass sheet further comprises moving the glass sheet a distance which is an even increment of column width which most closely approximately ½ of the distance between adjacent rollers.

7. A method of quenching a glass sheet comprising the following steps:

heating the glass sheet;

transferring the glass sheet to a first position in a quenching station having a horizontal roller conveyor for supporting the glass sheet and an upper and lower array of aligned nozzles arranged in a series of rows and columns having a 50% array density with the columns being generally parallel to the rollers and cooling a first array of points on the glass sheet while in the first position; and horizontally jogging the glass sheet on the conveyor within the quenching station a distance equal to an odd increment of column spacing to a second position and cooling a second array of points on the glass sheet while in the second position, whereby the first and second array of points create an array with 100% density.

8. The method of claim 7, wherein the step of jogging the glass sheet further comprises moving the glass sheet a distance which is an odd increment of column width which most closely approximates ½ of the distance between adjacent rollers.

9. The method of claim 7, wherein the step of jogging the glass sheet further comprises moving the glass sheet a selected distance, so that the series of points nearest a roller of the conveyor during the step of cooling the first array of points is not located adjacent a roller of the conveyor during the step of cooling the second array of points.

10. A glass sheet quenching apparatus comprising:

a horizontal roller conveyor for transferring a sheet of heated glass along a generally horizontal axis;

an upper and lower array of matching nozzles for directing coolant upon the upper and lower surfaces of the glass sheet to cool a corresponding array of points thereon;

drive means for rotating the rollers of the conveyor to advance the glass sheet; and control means for controlling the drive means and the nozzle array for transporting the glass sheet to a first position and causing the nozzle array to cool an array of first points while in the first position, and to horizontally jog the glass sheet to a second position and causing the nozzle array to cool an array of second points while in the second position which are oriented relative to the array of first points.

11. The apparatus of claim 10, wherein said upper and lower array of matching nozzles comprises a plurality of nozzles oriented in rows and columns forming an array of nozzles having a 50% array density, said columns being generally parallel to the rollers.

12. The apparatus of claim 11, wherein the upper end lower array of nozzles are provided with at least four columns of nozzles between adjacent rollers of the conveyor.

13. The apparatus of claim 11, wherein the rows and columns of nozzles have equal and uniform spacing.

* * * * *

UNITED STATES PATENT AND TRADEMARK OFFICE
CERTIFICATE OF CORRECTION

PATENT NO.  : 4,946,491

DATED       : August 7, 1990

INVENTOR(S) : Jonathan Barr

It is certified that error appears in the above-identified patent and that said Letters Patent is hereby corrected as shown below:

Column 4, line 22 (Appln. Page 7, line 26) "42" should be --32--.

Signed and Sealed this

Twelfth Day of May, 1992

Attest:

DOUGLAS B. COMER

*Attesting Officer*    *Acting Commissioner of Patents and Trademarks*